United States Patent [19]

Toumani

[11] 4,395,675
[45] Jul. 26, 1983

[54] TRANSFORMERLESS NONINVERTING BUCK BOOST SWITCHING REGULATOR

[75] Inventor: Rouben Toumani, Randolph, N.J.

[73] Assignee: Bell Telephone Laboratories, Incorporated, Murray Hill, N.J.

[21] Appl. No.: 313,957

[22] Filed: Oct. 22, 1981

[51] Int. Cl.[3] .............................................. G05F 1/46
[52] U.S. Cl. .................................. 323/271; 363/101;
    363/124; 323/282; 323/351
[58] Field of Search .................. 363/24, 25, 124, 101;
    323/259, 282, 271, 217, 344, 351

[56] References Cited

U.S. PATENT DOCUMENTS

| | | | |
|---|---|---|---|
| 4,186,437 | 1/1980 | Cuk | 363/65 |
| 4,245,286 | 1/1981 | Paulkovich et al. | 363/21 |
| 4,347,474 | 8/1982 | Brooks et al. | 323/282 X |

OTHER PUBLICATIONS

IBM Technical Disclosure Bulletin, "Pedestal Driver for Inductive Loads", J. E. Bateson & S. E. Bigbe, vol. 20, No. 8, Jan. 1978, pp. 2948-2951.

"A New Optimum Topology Switching DC-To-DC Converter", S. M. Cuk and R. D. Middlebrook, IEEE 1977 Power Electronics Specialists Conference, pp. 160-179.

"Modelling, Analysis and Design of Switching Converters", S. M. Cuk, Thesis, in Partial Fulfillment of the Requirement for the Degree of Doctor of Philosophy, California Institute of Technology, Pasadena, California, Nov. 29, 1976, pp. 181-188, 226-228.

Primary Examiner—William M. Shoop
Attorney, Agent, or Firm—A. G. Steinmetz

[57] ABSTRACT

A buck boost type noninverting transformerless switching regulator utilizes two synchronized switches operating at either the same or different duty cycles to independently control energy storage and energy delivery from a two terminal inductor element to the output load. A wide range of output voltage is available and is continuously regulated.

13 Claims, 9 Drawing Figures

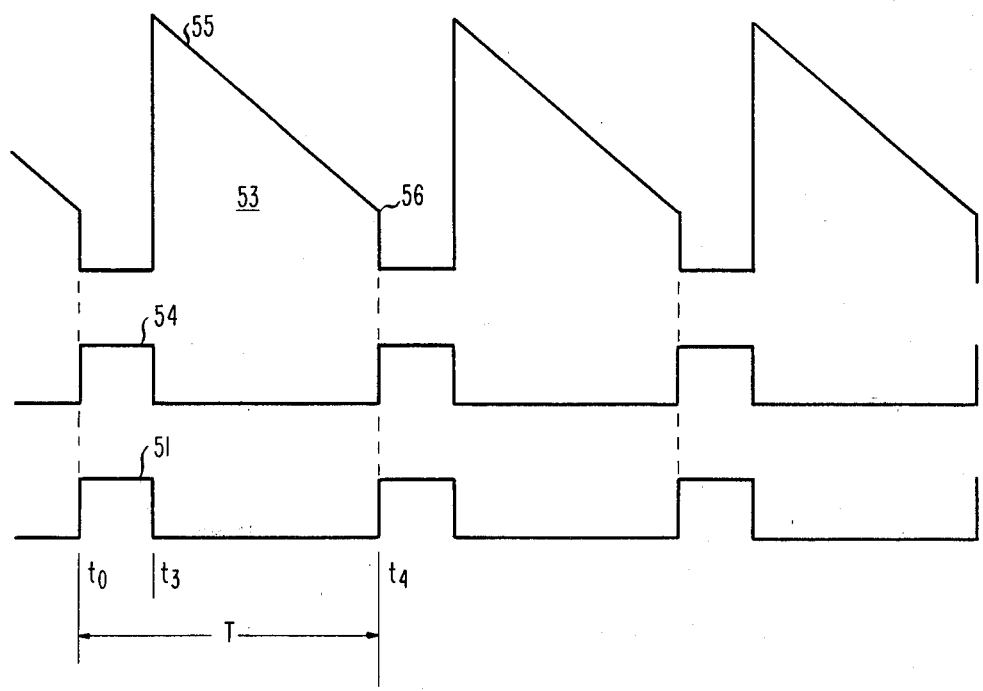
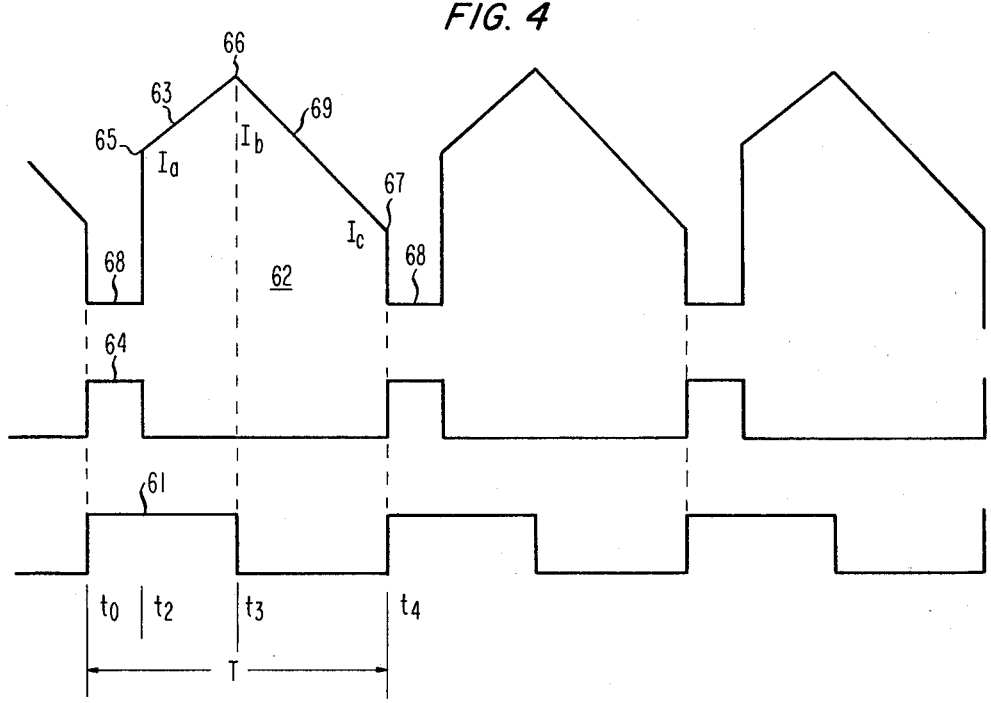

TRANSFORMERLESS NONINVERTING BUCK BOOST SWITCHING REGULATOR

TECHNICAL FIELD

This invention relates to switching regulators and, more particularly, to a switching regulator capable of providing a continuous extended output voltage range, which extends from zero to any desired output voltage magnitude without causing any polarity inversion of the DC output voltage relative to the polarity of the DC input voltage.

BACKGROUND OF THE INVENTION

In many applications, one is limited to a fixed DC voltage source, and a regulated output voltage range is required which extends from less than to greater than the input voltage magnitude. A DC-to-DC converter may be utilized to provide this extended range of output voltages. This extended range is provided through the use of a transformer in the converter, and the appropriate design of the turns ratio permits the selection of any desired output voltage range; however, transformers are costly and relative to the converter circuitry quite large in size.

These particular size and cost limitations may be overcome by the use of a switching regulator, which utilizes a two-terminal inductor as an energy storage device. The switching regulator has many advantages; it is easy to design, may be embodied in integrated form with perhaps the exception of the need for a discrete energy storage inductor and a discrete filter capacitor, is small in size and is very power efficient. However, it has the limitation that it cannot provide a continuous up/down voltage output range traversing the input voltage magnitude without inverting the polarity of the DC output voltage relative to the DC input voltage polarity. Hence voltage regulator designs that needed an extended range of controlled DC output voltage without inverting the polarity of the input voltage were forced to utilize the DC-to-DC converter which utilizes a transformer.

SUMMARY OF THE INVENTION

Therefore in accord with the principles of the invention, a buck boost switching regulator provides continuous up/down voltage conversion capability from zero to greater than the DC input voltage without the necessity of inverting the output voltage polarity with respect to the DC supply voltage. This extended range is achieved by using two independent switching devices, coupled to opposite terminals of an inductive energy storage element to independently control energy storage therein and energy release therefrom to the load. The two switching devices are synchronously driven but with differing duty cycles to independently control energy storage and release, in order to achieve the desired extended range of regulated output voltage.

By varying the respective duty cycles of the two synchronously switched switching devices, many controlled effects of the output current and voltage may be attained. All of the circuit components of this regulator, except the output filter capacitor and the energy storage inductor, may be embodied in integrated form, thereby reducing the size and cost of the switching regulator relative to a DC-to-DC converter.

BRIEF DESCRIPTION OF THE DRAWING

An understanding of the invention may be attained by reference to the following specification and accompanying drawing in which:

FIGS. 3, 4, 5 and 6 are signal waveform diagrams to assist in describing various modes of operation of the buck boost switching regulator shown in FIG. 2.

DETAILED DESCRIPTION

Figure 1:
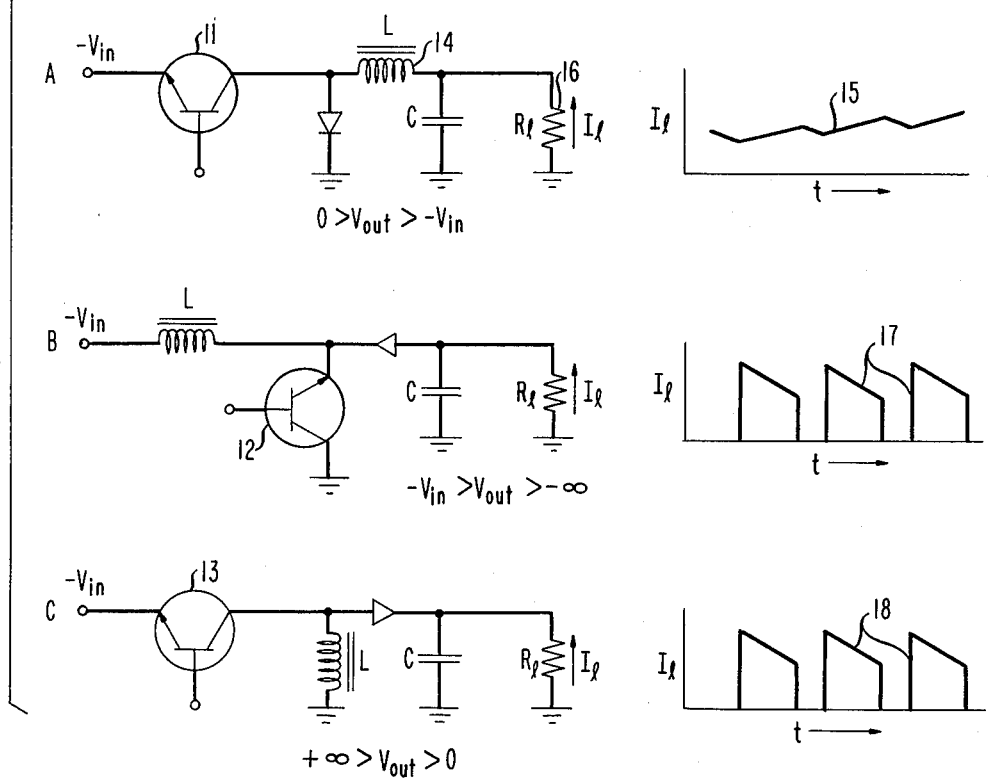
FIG. 1 shows of various types of prior art switching regulators.

Three classical configurations of prior art switching regulators utilizing a two-terminal energy storage inductor are shown in FIG. 1. The down conversion switching regulator, shown in FIG. 1, part A, provides a controlled negative DC output voltage derived from a negative DC voltage input.

While the examples shown herein refer to negative voltage inputs, the same principles apply to positive voltage inputs. The necessary polarity orientation of switching devices and diodes is obvious to those skilled in the art and hence no specific description is believed necessary.

In the particular embodiment shown, the negative DC output voltage magnitude may range from zero to the magnitude of the negative DC input voltage. The output voltage is readily controlled within this range by pulse-width modulating the switching transistor 11, however, the output voltage magnitude cannot transgress this range. This down conversion switching regulator shown in FIG. 1 has an operating advantage in that, the output load current $I_1$, shown by the current waveform 15 is continuous. The current $I_1$ flows through the load 16, even while energy is being stored in the energy storage inductor 14. This is in contrast to the switching regulators shown in FIG. 1 parts B and C and discussed below, which have a discontinuous load current.

An up conversion switching regulator, shown in FIG. 1, part B, generates an output voltage range that extends from the negative DC input voltage to theoretically minus infinity. The DC output voltage within this range is readily controlled by pulse-width modulating the switching transistor 12, and the output load current $I_1$ is discontinuous since it does not flow while energy is being stored in the inductor as shown by the current waveforms 17 associated with FIG. 1, part B.

In both instances, the controlled DC output voltage of the switching regulators in FIG. 1, parts A and B is of the same polarity as the applied DC input voltage; however, in each instance, the range of the DC output voltage is limited to be either less or greater than the magnitude of the applied DC input voltage. Hence the output voltage range in either example cannot pass through a magnitude barrier determined by the particular magnitude of the applied DC input voltage.

The switching regulator, shown in FIG. 1, part C, provides an extended range of controlled positive DC output voltage that ranges from zero to theoretically plus infinity by pulse-width modulating switching transistor 13. However, the polarity of the DC output voltage is inverted with respect to the negative polarity of the applied DC input voltage. As is shown by the accompanying waveform, the buck boost switching regulator shown in FIG. 1, part C provides a discontinuous output current $I_1$ as shown by current waveform 18. Output current does not flow while energy is being stored in the energy storage inductor.

Figure 2:
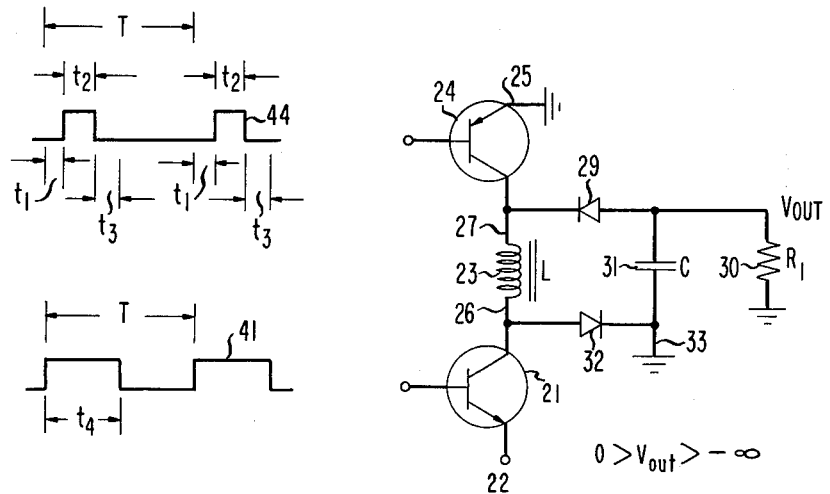
FIG. 2 is a schematic of a buck boost switching regulator designed in accord with the principles of the invention.

A new improved buck boost switching regulator embodying the principles of the invention is shown in FIG. 2. In this embodiment, a first switching transistor 21 couples a negative DC voltage input terminal 22 to one terminal 26 of the energy storage inductor 23. A second switching transistor 24 couples the second terminal 27 of the energy storage inductor to ground terminal 25. This second terminal 27 of the energy storage inductor 23 is also coupled, via a diode 29, to the output load 30 and to a filter capacitor 31. The first terminal 26 of the energy storage inductor 23 is coupled, via a diode 32, to ground terminal 33. The drive signals for the two switching transistors 21 and 24 are shown by the accompanying waveforms 41 and 44 representing the drive pulses to synchronously bias these switching transistors independently but synchronously conductive.

As is apparent from the transistor drive waveforms 41 and 44, the first switching transistor 21 is driven by a pulse having a period T and a pulse width of $t_4$. The drive pulse waveform 44 for the second transistor 24 need not have identical rise or fall times to those of the first drive pulse; however, both drive pulse waveforms must be synchronously switched with each other and be simultaneously high for at least some common time interval. The drive pulses must occur coincidently if the output voltage exceeds the input voltage so that energy can be stored in the energy storage inductor 23. The drive pulse waveform 44 for the second transistor also has the same period T, as waveform 41, but as shown, the pulse width $t_2$ of the driving pulse 44 is less than the pulse width $t_4$ of pulse waveform 41. In the waveforms shown the pulse intervals $t_2$ and $t_4$ represent the intervals of conduction for transistors 24 and 21, respectively. As shown, the leading edge of drive pulse waveform 44 occurs subsequent in time to the leading edge of the drive pulse waveform 41. Hence conduction in the first transistor 21 is initiated prior to conduction in transistor 24. Similarly, the drive pulse trailing edge of pulse waveform 44 occurs prior to that of drive pulse 41 causing transistor 24 to terminate conduction first. Various timing arrangements of the two drive pulses may be utilized to achieve special regulation control effects of the output voltage, however, the two transistor switches 21 and 24 must be synchronously operated with each other.

When the first and second switching transistors 21 and 24 are simultaneously biased conducting, diodes 29 and 32 are back biased as current builds up in the energy storage inductor 23 and energy is stored therein. When both the transistor switches 21 and 24 are simultaneously biased nonconducting, the energy stored in the inductor 23 maintains a current flow through the now forward biased diode 29 to the load impedance 30. Capacitor 31 filters out the AC components of the output current and maintain a steady DC voltage across the load resistor 30. By biasing the second transistor switch 24 conducting simultaneously with transistor switch 21, energy may be transferred from the input source to the energy storage inductor 23, even if the absolute magnitude of the output voltage across load 30 exceeds the absolute magnitude of the input DC supply voltage at terminal 22 without any polarity inversion of the DC output voltage relative to the DC input voltage. Hence an extended range of regulated output voltage identical in polarity to the input voltage is possible. The versatility of the regulator circuit of FIG. 2 permits many varied advantageous effects to be created by utilizing different duty cycles for the two transistor switches as long as they are operated synchronously with each other.

While the switching regulator of FIG. 2 is shown with one terminal of the load grounded, the regulator can provide a floating output voltage not referenced to ground in which the ground voltage connected to diode 32 is eliminated and replaced by a different reference voltage and the load 30 is connected in shunt across the capacitor 31.

The operation of the switching regulator circuit shown in FIG. 2 may be readily understood by describing several varied modes of operation with specific reference to the waveforms in FIGS. 3, 4, 5 and 6, each of which define various selected operating modes in order to illustrate the underlying operating principles of the switching regulator. It is to be understood that the various operating arrangements represented by the waveforms in FIGS. 3, 4, 5 and 6 are not intended to show all possible modes of operation or to limit the scope of the invention.

The waveforms in FIG. 3 represent a condition, in which, both transistor switches 21 and 24 are driven simultaneously conducting by simultaneous biasing pulses 51 and 54 having equal duty cycles. In this particular mode of operation, the output load current waveform 53 has a single peak trapezoidal wave shape in which current has an initial peak value at point 55 and decays to a lesser value at point 56. In this example, it is assumed that flux in the inductor does not decay to zero; if it did decay to zero, the load current waveform would be triangular as is well-known to those skilled in the art. The output load current only flows during the time interval $(t_4-t_3)$ when both the first and second transistor switches 21 and 24 are biased nonconducting. The conducting intervals $(t_3-t_0)$ of both transistor switches 21 and 24 are utilized to store energy in the energy storage inductor 23, which energy is subsequently delivered to the load 30 as load current pulse 53. In this mode of operation, energy is stored in the energy storage inductor 23 even if the output voltage exceeds the magnitude of the input voltage.

In the second mode of operation, as shown by the waveforms of FIG. 4, the first and second transistor switches 21 and 24 are synchronously driven by drive pulses 61 and 64 having differing duty cycles from each other. Transistor switch 21, as shown by drive waveform 61, is driven conducting at approximately a 50 percent duty cycle. Duty cycles other than 50 percent will produce substantially the same effect. Transistor switch 24 is driven conducting by pulse 64 at a lesser duty cycle. The output current waveform 62 has three separate vertex points 65, 66 and 67 that correspond to the various leading and trailing edges of the two pulse drive waveforms 61 and 64.

This particular load current waveform response shown by waveform 62 occurs in a situation where the magnitude of the negative output voltage is between the magnitude of the negative DC input voltage and zero. The time interval $(t_2-t_0)$ when both drive pulses are concurrent with each other and both switching transistors 21 and 24 are conducting, is an interval of no output load current, as seen from the zero current level 68 of current waveform 62 and is the interval when energy is stored in the energy storage inductor 23. As soon as the second transistor switch 24 is biased nonconducting at time $t_2$, the output load current jumps to a first vertex point 65 and increases as a ramp-like waveform 63 to vertex point 66, at time $t_3$ whereat, the first transistor switch 21 is biased nonconducting. The energy stored in the inductor then decays and follows the negative ramp slope 69 to vertex point 67, at time $t_4$ where both transistor switches 21 and 24 are again biased into conduction, and the output load current drops to zero level 68.

Figure 5:
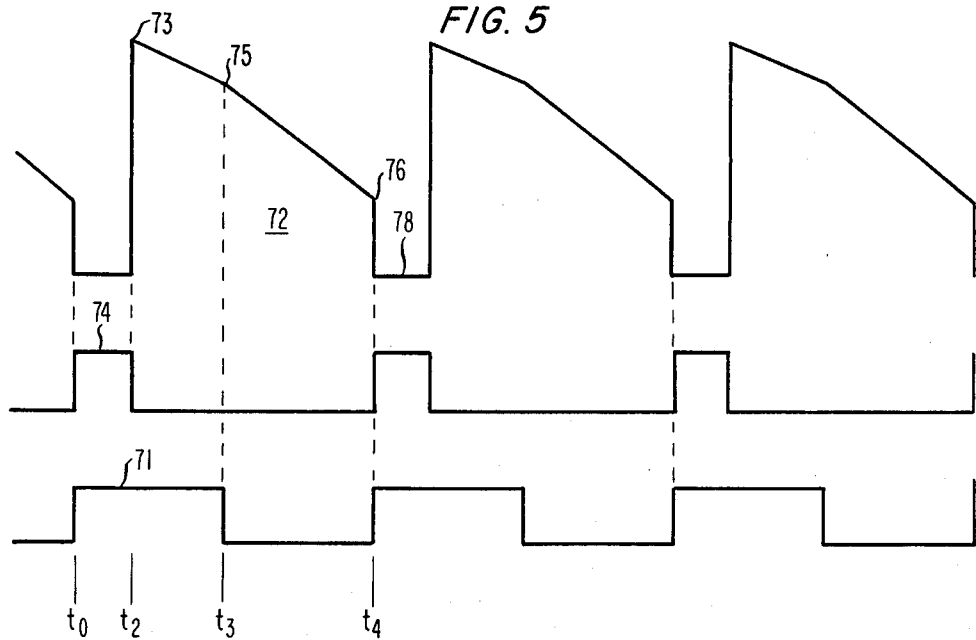

An identical drive pulse arrangement is shown in FIG. 5 for a condition in which the negative DC output voltage is more negative or greater in absolute magnitude than the negative DC input voltage. The output load current waveform 72 assumes a different polygon shape from that of FIG. 4. Its initial value at time $t_2$ increases to a peak vertex value 73 at the instant the second transistor 24 is biased nonconducting at the trailing edge of the drive pulse 74. Current waveform 72 decays at a first slope value from vertex point 73 to a second vertex point 75, at time $t_3$, when the first transistor 21 is biased nonconducting at the trailing edge of the drive pulse 71. The output current due to the stored energy in the inductor 23, decays from vertex point 75 to vertex point 76, when both transistors 21 and 24 are biased into conduction at time $t_4$, and as shown in FIG. 5, the output load current waveform 72 drops to zero level 78.

Figure 6:
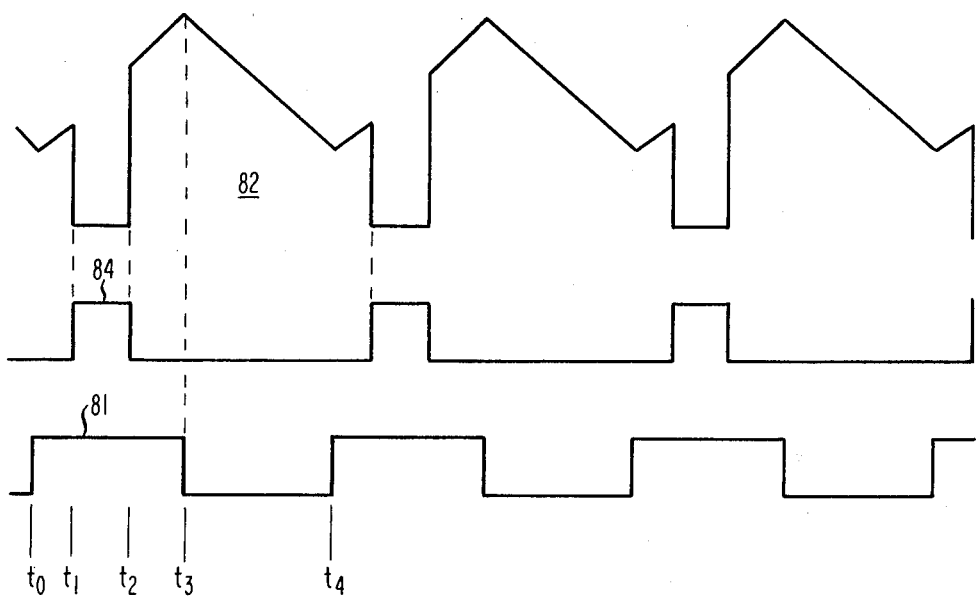

FIG. 6 shows a current waveform for the output current of the regulator when the biasing of the second transistor 24, while synchronous with the first transistor has independent leading and trailing pulse edges. In this example, transistor switch 24 is biased into conduction after the first transistor 21 has been conducting for an interval $(t_1-t_0)$. The drive pulse 84 for the second transistor 24 has its leading edge occurring at a substantial time interval $(t_1-t_0)$ after the leading edge of the drive pulse 81 of the first transistor 21. The output current waveform assumes a polygon wave shape as shown for a situation where the output voltage lies between the magnitude of the DC supply voltage and zero.

The corresponding current waveform for output voltages greater in magnitude than the input voltage, in this situation, will suggest themselves to those skilled in the art and need not be described in detail herein.

The various load current waveforms that will occur may be readily derived by those skilled in the art by use of the following analytical relationships which describe the operation of a buck boost switching regulator embodying the principles of the invention such as shown in FIG. 2. This analysis as applied to FIG. 4, for example, essentially computes the instantaneous load current at three critical vertex locations: (i) when both switches are initially conducting; (ii) when the first switch terminates conduction; and (iii) when the second switch terminates conduction. The analysis for the other figures will be readily apparent to those skilled in the art. Hence solving for the instantaneous currents and voltage drops in the regulator circuit for each situation provides the following analytical relations expressed in the following equations (1), (2) and (3) wherein $V_{in}$ is the magnitude of the input DC voltage; $V_{out}$ is the magnitude of the regulated DC output voltage; L is the inductance of the energy storage inductance; and $I_a$, $I_b$ and $I_c$ are the instantaneous vertex currents of the trapezoidal load current waveform corresponding, for example, to points 65, 66 and 67 of waveform 62 in FIG. 4. $T_{60}=(t_2-t_0)$ is the time interval when both transistor switches are conducting; $T_\beta=(t_3-t_2)$ is the interval when only the first transistor switch 21 is conducting; and $T_\gamma=(t_4-t_3)$ is the interval when neither of the transistor switches 21 or 24 is conducting. The waveform period is designated T. It is apparent that the sum of $t_\gamma$, $t_\beta$ and $t_\alpha$ is the period T. It is assumed in the following equations that no voltage drops occur across the diodes 29 and 32 and that the current in the inductor 23 never drops to a zero value.

$$V_{in} = L \frac{(I_a - I_c)}{T_\alpha} \tag{1}$$

$$V_{in} - V_{out} = L \frac{(I_b - I_a)}{(T_\beta)} \tag{2}$$

$$V_{out} = L \frac{(I_b - I_c)}{(T_\gamma)} \tag{3}$$

The average output DC current may be simply calculated by computing the current time area of the load current wave 62 such as shown in FIG. 4 and divide by the period, whereupon, the average output current is defined as in equation 4.

$$I_{DC} = \frac{(I_a + I_b)}{2T} T_\beta + \frac{(I_b + I_c)}{2T} T_\gamma \tag{4}$$

With equations (1) through (4), the following design equations (5) through (8) of the regulator may be derived to define the output voltage and the three vertex currents, $I_a$, $I_b$, and $I_c$ of the output current polygon waveform.

$$V_{out} = \frac{(T_\alpha + T_\beta)}{(1-K)T} V_{in} \tag{5}$$

$$I_a = \frac{I_{DC}}{1-K} + I_{in}\left[\frac{K_2}{1-K} + 2K - (1+K)\frac{V_{out}}{V_{in}} + M\right] \tag{6}$$

$$I_b = \frac{I_{DC}}{1-K} + I_{in}\left[\frac{K^2}{1-K} + (1-K)\frac{V_{out}}{V_{in}} - M\right] \tag{7}$$

$$I_c = \frac{I_{DC}}{1-K} + I_{in}\left[\frac{K^2}{1-K} - (1+K)\frac{V_{out}}{V_{in}} + M\right] \tag{8}$$

where $$K = \frac{T_\alpha}{T} \tag{9}$$

$$I_{in} = \frac{V_{in}T}{2L} \tag{10}$$

$$M = \left[\frac{V_{out}}{V_{in}}\right]^2 (1-K) \tag{11}$$

From these equations one can deduce the maximum output voltage attainable for the regulator which is defined in the following equation 12.

$$|V_{out}|\ max = \frac{V_{in}}{1-K} \tag{12}$$

This condition of maximum output voltage occurs when the second transistor switch 24 is continuously conducting. By examination of the above equations (5) through (8), it becomes apparent that the value for $I_b$ represents the maximum peak current when the output voltage is less than the input voltage and $I_a$ represents the peak current when the output voltage is greater than the input voltage.

Figure 7:
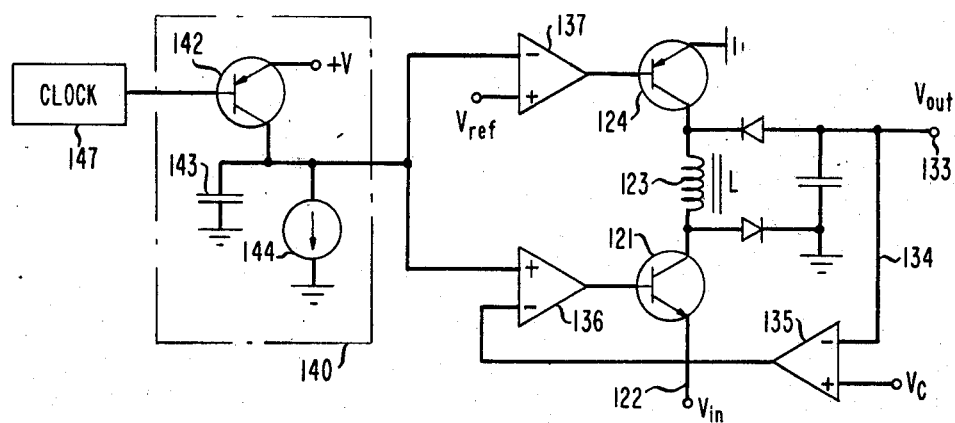
FIGS. 7, 8 and 9 are schematics of the switching regulator including various feedback schemes by which the buck boost switching regulator of FIG. 2 may be controlled.

A buck boost switching regulator, as shown in FIG. 7, utilizes a feedback arrangement to regulate the output voltage and establish the regulated output voltage range. The first switching transistor 121 is operated with a variable duty cycle and the second switching transistor 124 is operated at a fixed duty cycle. A negative DC voltage input is applied to terminal 122 coupled to the emitter of the first switching transistor 121. A negative DC output voltage is sensed at the output terminal 133 and feedback, via a lead 134, to an error amplifier 135 where the output voltage magnitude is compared to a control voltage $V_c$. The comparator output establishes a first reference voltage which is applied to an inverting input of a comparator drive amplifier 136 which drives the first switching transistor 121. A comparator drive amplifier 137 coupled to drive the second switching transistor 124 has its noninverting input connected to a fixed second reference voltage to control the duty cycle of transistor 124. Control voltage $V_c$ determines the voltage regulation of the output voltage.

Both the comparator drive amplifiers 136 and 137 have their inverting and noninverting inputs, respectively, supplied by a ramp waveform generator 140. The ramp waveform generator 140 is driven by a clock 141, which periodically enables a transistor 142 within generator 140 to charge a capacitor 143, which in turn, discharges into a current sink 144. The ramp waveform applied to comparator 137 causes its output to go low whenever the magnitude of the ramp magnitude exceeds the magnitude of the fixed second reference voltage applied to the noninverting input. Hence it is apparent that the transistor switch 124 operates at a fixed duty cycle. The ramp waveform applied to comparator 136 causes its output to go high when the ramp magnitude exceeds the variable first reference voltage applied to its inverting input. Since the first reference voltage is the error signal, the duty cycle of the first transistor switch will be modulated to counteract changes in the output voltage. As discussed above, the simultaneous conduction of transistor switch 124 with transistor switch 123 permits energy storage in the inductor 123 even when the output voltage exceeds the input voltage. This mode of operation may conform to the waveforms of either FIG. 4 or FIG. 5. In this mode of operation, the switching regulator circuit can operate as either an up or down conversion switching regulator.

Figure 8:
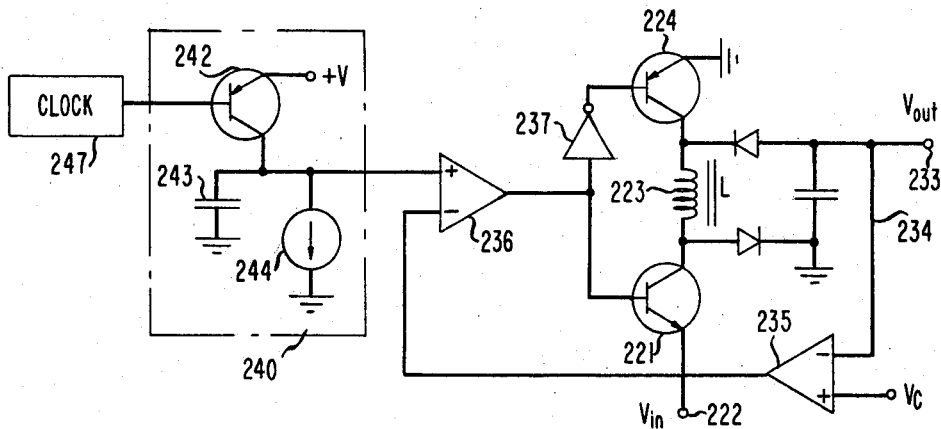

Another feedback arrangement is included in the buck boost switching regulator shown in FIG. 8. In this version, both the first and second switching transistors are operated simultaneously with an identical variable duty cycle. The waveforms of this mode of operation which permits an unlimited continuous up/down output voltage conversion conforms to those shown in FIG. 3. The output voltage is sensed at output terminal 233 and feedback, via lead 234, to an error amplifier 235 where it is compared with a control voltage $V_c$. The output of error amplifier 235 is applied to a drive comparator amplifier 236, which is connected to supply drive pulses to both the first and second switching transistors 221 and 224. Its output is applied directly to the first switching transistor 221 which is an NPN type and is inverted by an inverter level shifter 237 before application to the second switching transistor 234 which is a PNP type. As before, the comparator drive amplifier 236 is driven by a ramp voltage generator 240, which has its output connected to the noninverting input of the comparator drive amplifier 236.

Figure 9:
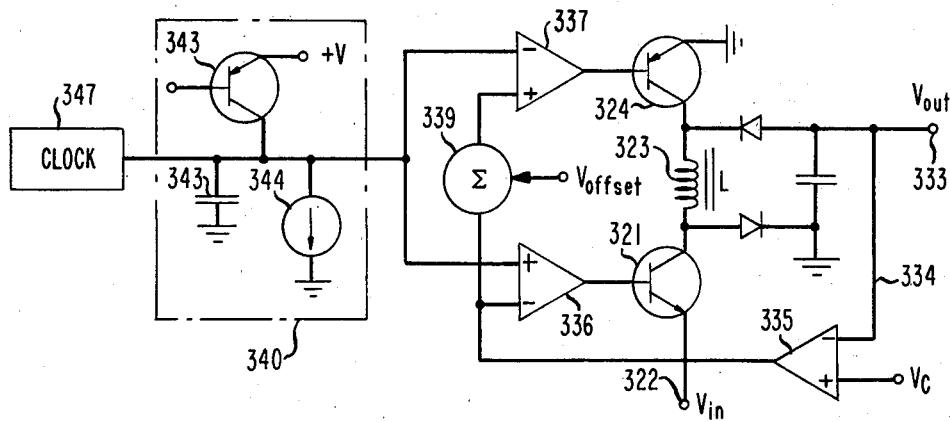

A somewhat more complicated operational mode for a buck boost switching regulator designed in accord with the principles of the invention, is shown in FIG. 9. In this particular arrangement, the second switching transistor 324 is not biased conducting until the output voltage, sensed at output terminal 333, has reached a level substantially equal to or exceeding the DC input voltage at input terminal 322. In this particular arrangement, the regulator can, again, operate as an unlimited continuous up/down regulator. As long as the desired output voltage is less in absolute magnitude than the absolute magnitude of the input voltage $V_{in}$, the second switching transistor 324 remains nonconducting, and control is through pulse-width modulating the first switching transistor 321 only.

As can be seen from FIG. 9, the output voltage is sensed and applied, via a lead 334, to the error amplifier 335 where it is compared with a control voltage $V_c$. The output of the error amplifier 335 is applied to the inverting input of a first comparator drive amplifier 336 coupled to drive the first switching transistor 321, which is driven conducting when a ramp waveform supplied by the ramp waveform generator 340 exceeds the output of error amplifier 335 applied to the inverting input of comparator 336. The output of the error amplifier 335 is also applied to a summing circuit 339. A voltage offset is also applied to summing circuit 339 and its summed output value is applied to the noninverting input of the second comparator drive amplifier 337 used for controlling the second switching transistor 324.

The ramp waveform generator is applied to the inverting input of the second comparator drive amplifier 337. The offset voltage applied to the noninverting input of comparator drive amplifier 337 is selected so that the ramp voltage only drives the transistor 324 into conduction when the error voltage applied to the summing circuit assumes a value indicating the absolute magnitude of the regulated DC output voltage is substantially equal to or above the absolute magnitude of the DC input voltage.

The switching regulator of FIG. 9 operated in this mode provides a continuous up/down range of output voltages. However, as long as the regulated output voltage is less than the input voltage, only the transistor switch 321 is operative. When the regulated output voltage exceeds the input voltage, transistor switch 324 becomes operative and at high output voltages, transistor 321 is biased continuously conducting with transistor 324 pulse-width modulated to store the necessary energy to supply the regulated output voltage.

While particular examples embodying the principles of the invention have been shown herein, it is to be understood that those skilled in the art can devise many variations therefrom which do not depart from the scope of the invention described herein.

What is claimed is:

1. A switching type power conditioning circuit comprising:
   input means for accepting a DC voltage source, output means for accepting a load to be energized by the DC voltage source, a signal winding inductive energy storage medium, a first switch interconnecting one end terminal of the storage medium to the input means, a flyback diode interconnecting the one end terminal to a signal reference point, a decoupling diode interconnecting an opposite end terminal of the storage medium to the load, a second switch interconnecting the opposite end terminal to the signal reference point, and means for synchronously driving the first and second switches with overlapping first and second duty cycles, respectively.

2. A switching type power conditioning circuit as defined in claim 1 wherein said means for synchronously driving comprises:

means for comparing an output voltage at the output means with a control voltage and generating an error signal, means for pulse-width modulating the first switching device in response to the error signal, and means for driving the second switching device at a fixed duty cycle.

3. A switching type power conditioning circuit as defined in claim 1 wherein said means for synchronously driving comprises:

means for comparing an output voltage at the output means with a control voltage and generating an error signal, and means for simultaneously pulse-width modulating the first and second switching device in response to the error signal.

4. A switching type power conditioning circuit as defined in claim 1 wherein said means for synchronously driving comprises:

means for comparing an output voltage at the output means with a control voltage and generating an error signal, means for pulse-width modulating the first switching device in direct response to said error signal, means for summing the error signal with an offset voltage, and means for pulse-width modulating the second switching device in response to an output of said means for summing.

5. A buck boost switching regulator comprising:

means for accepting a DC voltage source, means for storing electrical energy inductively, a first switching device for coupling the DC voltage source to the means for storing electrical energy, means for coupling energy in said means for storing electrical energy to a load to be energized including, a second switching device for coupling the means for storing electrical energy to a reference voltage point, said means for coupling including a diode coupling a junction of the second switching device and the means for storing electrical energy to the load, and means for synchronously driving and independently pulse-width modulating the first and second switching device, whereby simultaneous conduction of the first and second switching device permits energy storage in the means for storing electrical energy and independent pulse-width modulation of the first switching device and second switching device controls a magnitude of a voltage across the load to be energized.

6. A buck boost switching regulator as defined in claim 5 wherein said means for synchronously driving and independently pulse-width modulating comprises:

means for comparing an output voltage with a control voltage and generating an error signal, and means for pulse-width modulating the first switching device in response to the error signal, and means for driving the second switching device at a fixed duty cycle.

7. A buck boost switching regulator as defined in claim 5 wherein said means for synchronously driving and independently pulse-width modulating comprises:

means for comparing an output voltage with a control voltage and generating an error signal, and means for simultaneously pulse-width modulating the first and second switching device in response to the error signal.

8. A buck boost switching regulator as defined in claim 5 wherein said means for synchronously driving and independently pulse-width modulating comprises:

means for comparing an output voltage with a control voltage and generating an error signal, means for pulse-width modulating the first switching device in direct response to said error signal, and means for summing the error signal with an offset voltage, and means for pulse-width modulating the second switching device in response to an output of said means for summing.

9. A buck boost switching regulator comprising:

an input terminal for connection to a DC voltage source, an output terminal for connection to a load to be energized, a ground terminal for connection to a ground reference, an energy storage inductor having first and second end terminals, a first transistor switch interconnecting the input terminal and the first end terminal of the energy storage inductor, a first diode coupling the first end terminal of the energy storage inductor to a reference ground, a second transistor switch interconnecting the ground terminal and the second end terminal of the energy storage inductor, a second diode coupling the second end terminal of the energy storage inductor to the output terminal and poled to deliver energy from the energy storage inductor to the output terminal, drive circuitry for synchronously driving the first and second transistor switches into a saturated conduction mode and including first and second comparator circuits with independent first and second reference terminals for connection to independent first and second reference voltages so that the first and second transistor switches may be driven with independent first and second duty cycles.

10. A buck boost switching regulator as defined in claim 9 and further including:

an error amplifier having a first error input coupled to a control voltage and a second error input coupled to sense a voltage at the output terminal, and an output of the error amplifier coupled to the first reference terminal and being utilized as the first reference voltage, and a fixed preset second reference voltage being connected to the second reference terminal.

11. A buck boost switching regulator as defined in claim 9 and further including:

an error amplifier having a first error input coupled to a control voltage and a second error input coupled to sense a voltage at the output terminal, and an output of the error amplifier coupled to the first reference terminal and being utilized as the first reference voltage, a voltage summing circuit having first and second summing inputs coupled to the output of the error amplifier and a fixed preset offset voltage, respectively, and further including a summing output coupled to the second reference terminal and utilized thereat as the second reference voltage.

12. A buck boost switching regulator comprising:

an input terminal for connection to a DC voltage source, an output terminal for connection to a load to be energized, a ground terminal for connection to a ground reference, an energy storage inductor having first and second end terminals, a first transistor switch interconnecting the input terminal and the first end terminal of the energy storage inductor, a first diode coupling the first end terminal of the energy storage inductor to a reference ground, a second transistor switch interconnecting the ground terminal and the second end terminal of the energy storage inductor, a second diode coupling the second end terminal of the energy storage inductor to the output terminal and poled to deliver energy from the energy storage inductor to the output terminal, driving circuitry for synchronously driving the first and second transistor switches into a saturated conduction mode and including at least a comparator circuit coupled to drive both the first and second transistor switches, the comparator circuit adapted to receive a reference voltage input, an error amplifier having a first error input coupled to a control voltage and a second error input coupled to sense a voltage at the output terminal, and an output of the error amplifier coupled to the comparator circuit to supply the reference voltage input thereto.

13. A switching type power conditioning circuit comprising:

input means for accepting a DC voltage source, output means for accepting a load to be energized by the DC voltage source, a two terminal inductive energy storage medium, a first commutating switch successively interconnecting one end terminal of the storage medium to the input means, and to a signal reference point, a second commutating switch successively interconnecting an opposite end terminal of the storage medium to the load, and to a second signal reference point, and means for synchronously driving the first and second commutating switches with overlapping interconnection intervals to the input means and the second signal reference point, respectively.

* * * * *